United States Patent [19]
Sinnhuber

[11] Patent Number: 5,921,576
[45] Date of Patent: Jul. 13, 1999

[54] AIRBAG DEVICE

[75] Inventor: Ruprecht Sinnhuber, Gifhorn, Germany

[73] Assignee: Volkswagen AG, Wolfsburg, Germany

[21] Appl. No.: 08/874,550

[22] Filed: Jun. 13, 1997

[30] Foreign Application Priority Data

Jun. 14, 1996 [DE] Germany .......................... 196 23 875

[51] Int. Cl.[6] ................................................ B60R 21/22
[52] U.S. Cl. .................................... 280/730.2; 280/728.2
[58] Field of Search ............................ 280/730.1, 730.2, 280/732, 728.3, 728.2

[56] References Cited

U.S. PATENT DOCUMENTS

| 5,118,132 | 6/1992 | Nakajima | 280/728.3 |
|---|---|---|---|
| 5,265,903 | 11/1993 | Kuretake et al. | 280/730.2 |
| 5,303,951 | 4/1994 | Goestenkors et al. | 280/732 |
| 5,308,112 | 5/1994 | Hill et al. | 280/730.2 |
| 5,316,336 | 5/1994 | Taguchi et al. | 280/730.2 |
| 5,322,322 | 6/1994 | Bark et al. . | |
| 5,447,326 | 9/1995 | Laske et al. | 280/730.2 |
| 5,490,691 | 2/1996 | Sinnhuber et al. | 280/730.3 |
| 5,540,459 | 7/1996 | Daniel | 280/730.2 |
| 5,664,800 | 9/1997 | Lux et al. | 280/728.2 |
| 5,669,627 | 9/1997 | Marjanski et al. | 280/730.2 |
| 5,678,852 | 10/1997 | Brown et al. | 280/728.2 |
| 5,687,987 | 11/1997 | Spencer et al. | 280/730.2 |
| 5,755,457 | 5/1998 | Specht | 280/730.2 |

FOREIGN PATENT DOCUMENTS

| 619 204 | 10/1994 | European Pat. Off. . |
|---|---|---|
| 694444 | 1/1996 | European Pat. Off. . |
| 42 38 427 | 5/1993 | Germany . |
| 43 04 919 | 9/1993 | Germany . |
| 43 07 175 | 9/1993 | Germany . |
| 44 26 848 | 2/1996 | Germany . |
| 2 191 450 | 12/1987 | United Kingdom . |

*Primary Examiner*—Paul N. Dickson
*Attorney, Agent, or Firm*—Cohen, Pontani, Lieberman & Pavane

[57] ABSTRACT

An airbag device for occupants of a vehicle having at least one airbag which can be inflated by at least one gas generator and is arranged beneath a wall element or a housing of a paneling part. To provide an airbag device which is easy to install, in the folded-together state, the airbag is fastened to the wall element or the housing. Consequently, the paneling element, on the one hand, and the airbag, on the other hand, together form a preassembled module. The wall element or housing designed in this way as a module support is provided with an arresting member by which the entire preassembled module can be fastened to the vehicle body and/or to other paneling parts.

28 Claims, 3 Drawing Sheets

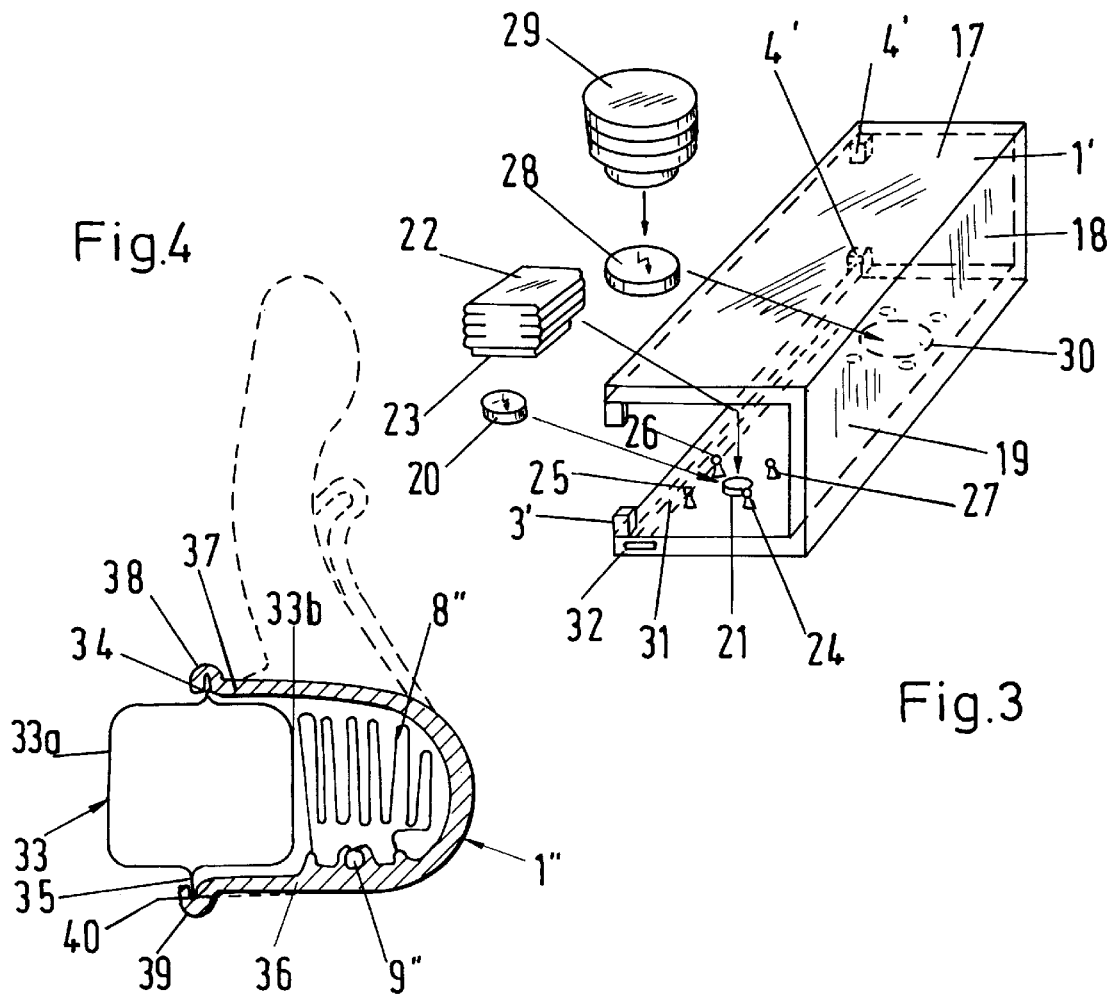

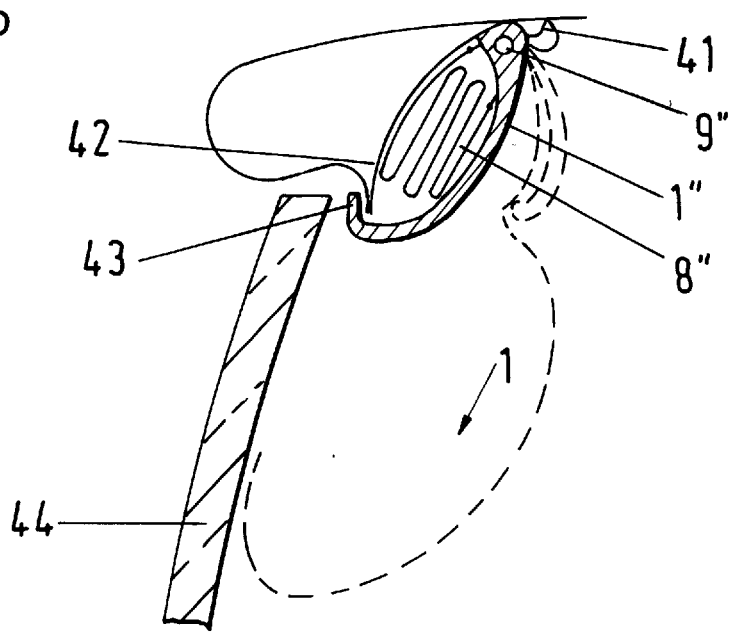
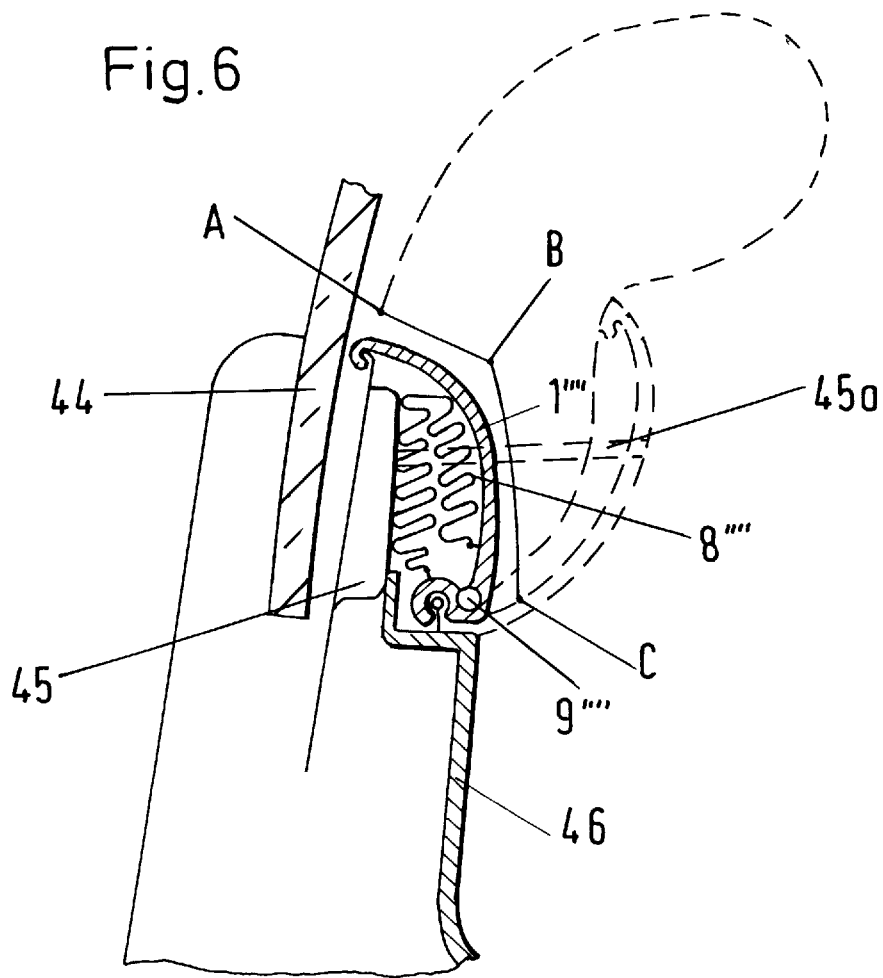

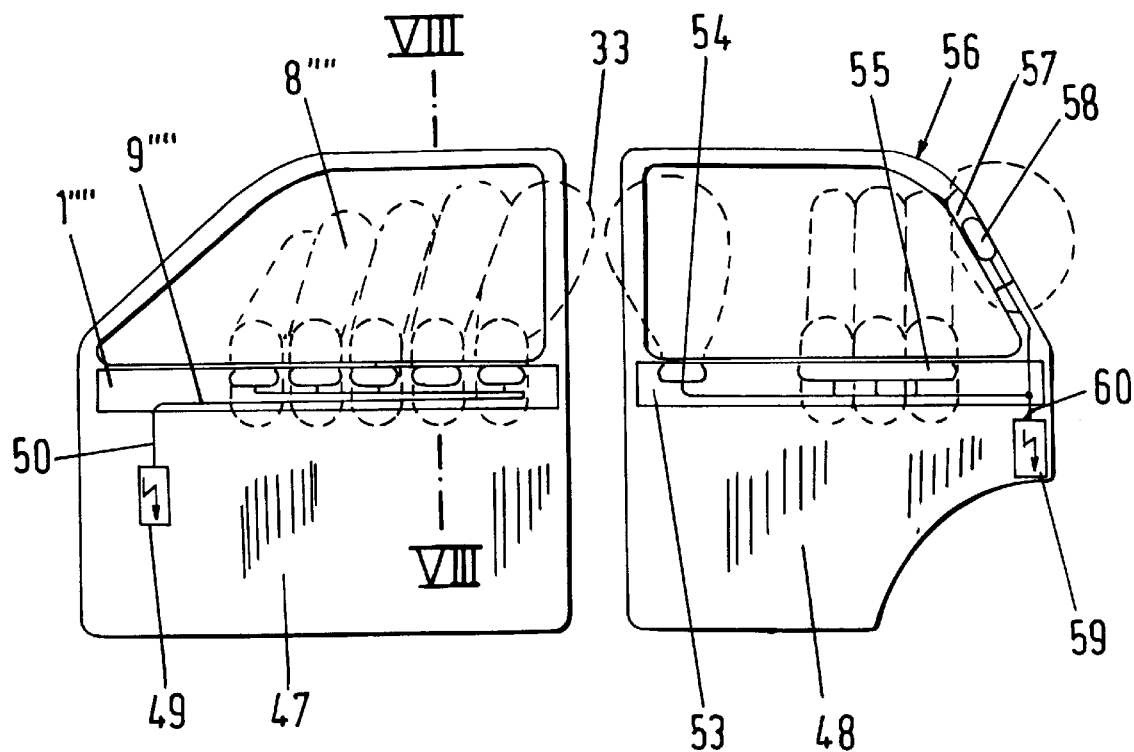
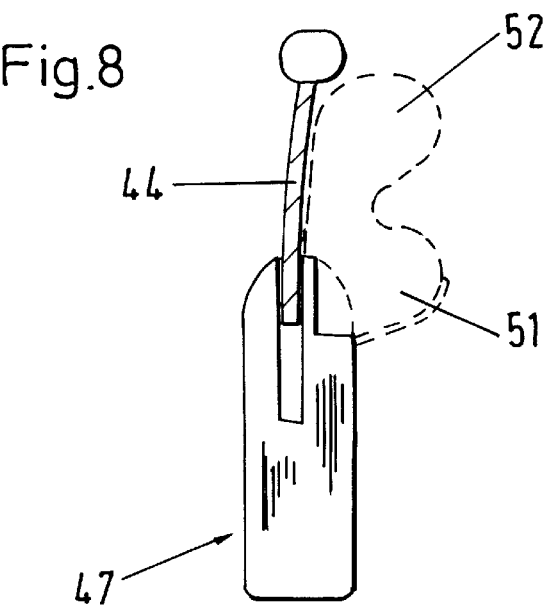

AIRBAG DEVICE

BACKGROUND OF THE INVENTION

1. Field of the Invention

The invention relates to an airbag device,

2. Description of the Prior Art

A great variety of airbag devices of the generic type are known. In this respect reference is had, for example, to the documents DE-43 04 919-A1 and DE-43 07 175-A1, and GB 2 191 450, DE 42 38 427 and U.S. Pat. No. 5,322,322. All the documents disclose in diagrammatic representations that beneath interior paneling parts there is arranged at least one airbag which can be inflated by a gas generator. However, there are no indications as to the actual configuration of the interior paneling part, in particular with regard to fastening to parts of the frame of the vehicle.

According to Laid-Open Applications DE-44 26 848 and EP 0 694 444 A2, there is proposed for fastening the airbag device a clamping device similar to a weatherstrip, which is fitted onto a retaining plate. Proposed for fixing the folded airbag in position are envelopes, which are likewise fastened to the clamping device but are not used as part of the trim.

To round off the prior art, reference is made to EP 0 619 204-A2. This reference discloses a supporting body for an airbag device, to which a paneling element is also fastened as a covering cap.

SUMMARY OF THE INVENTION

The object of the present invention is to provide an easy-to-assemble construction for airbag devices of the generic type.

According a first embodiment of the invention, in the folded-together state the airbag is assigned to the paneling part itself, which is designed as a molding, to form a preassembled module. Furthermore, on the paneling part itself there are provided arresting means, by which the preassembled module can be fixed on the vehicle body and/or on neighboring paneling parts. As a departure from EP 0 694 444, there is thus no need for the assembly of an additional paneling part as a cover for the airbag. With the solution according to the invention, it is even possible to separate the module formed by the paneling part and airbag from the weatherstrip. This is of particular advantage when installing the airbag device in the region of a roof frame, because the weatherstrip region, which in the area of the door is often subjected to impact and abrasion through door movement and movements related to people entering and exiting the vehicle, can be isolated from the internal paneling part. Thus, the internal paneling part does not have to be involved and remains in its assembled position virtually without any damage throughout its entire service life, in a visually appealing way. A second embodiment of the invention additionally or alternatively provides that the wall element belonging to the paneling element serves as a guide for the airbag during the inflation process. By means of stable articulation—in other words by maintaining a defined coupling between the vehicle body and the paneling element—for example in the roof frame region, specific unfolding along the side window and/or vertical pillar can be produced. This is of advantage particularly whenever during side impact the occupant to be protected is in an unfavorable position.

According to a further advantageous configuration of the invention, the degree of integration can be increased for the preassembled module by both propellant line connections for the airbag and component parts of the propellant supply line being fastened on a rear side of the paneling part which is not visible for the vehicle occupants. Paneling parts produced from injection-molded plastic may additionally have molded-in ducts, which are component parts of the propellant supply system. To be regarded as a particular advantage of the embodiments of the invention is that they can also be provided as a retrofit solution for vehicles already in series production. Conventional paneling parts can be removed without great effort and replaced by paneling parts with the additions according to the invention. The connection to gas generators installed in some other way, in other words outside the cavity covered by the paneling part, for example in cavities of pillars, horizontally running profile elements or in doors, can be made with little effort, because the propellant supply line, which can be made to be relatively narrow (between 5 and 20 mm in diameter), can be laid without any problems.

In the case of a further advantageous embodiment, the gas generator is likewise able to be arrested in detent devices on the rear side of the paneling part. It is also conceivable for a plurality of small gas generators to be distributed on the rear side of the paneling parts. If appropriate, there may be assigned to these generators individual smaller airbags, or they may all be jointly in connection with a large airbag. In the case of such a distribution of a plurality of gas generators, there may be provided, for example, a line or cable harness system for the signal lines, which is either an integral component part of the paneling element or is able to be clipped onto directly molded-on detent lugs. It is also conceivable, however, for there to be molded in electrical plug-in contacts, which at the same time also serve for the overall mechanical arresting of the individual gas generators. This measure has the effect of further increasing the degree of integration of the preassembled module.

Also to be mentioned as an advantage is the fact that, specifically in the case of paneling parts which cover a large surface area, only few folds are necessary for the airbag to be installed in an ordered manner. This way of packing the airbag allows the latter to be inflated more quickly into a restraining position than airbags with compact folding. In addition, the less pronounced unfolding movements cause the noise to which the occupants are subjected to be significantly minimized.

It is also of special significance that all the functional elements arranged on the rear side of the paneling element (airbag, gas generators, guiding and tensioning bands and straps, fluid or propellant lines and their connections and electrical contact elements) are in the form of standard components which can be fastened on the modular principle to paneling elements shaped to the individual requirements of the vehicle.

It must also be emphasized that, with the airbag device according to the invention, so-called "smart airbag concepts" can be realized. For example, an optimum protective effect can be achieved by specific inflation of the airbag initially in the regions where there is a risk of head impact or by a predetermined timing or explosive charge management in the activation of a plurality of individual bags.

Especially with the second embodiment of the invention, particularly good results can be achieved with respect to occupant protection in side impact accidents for the head and/or thorax region. By specifically prescribing the opening movement of the paneling element during airbag filling, it can be ensured that the unfolding of the airbag proceeds in a very controlled manner and consequently, for example, even vehicle occupants who are in an unfavorable restraining position in a collision are first of all pushed into a favorable restraining position and subsequently receive effective impact protection. For this purpose, special airbag folding may be provided.

BRIEF DESCRIPTION OF THE DRAWINGS

Advantageous exemplary embodiments of the invention are represented in the drawing, in which:

FIG. 1 shows a cross section through a housing, which has a hollow chamber for receiving an airbag, FIG. 2 shows an enlarged view of detail II in FIG. 1, FIG. 3 shows schematic representation of a paneling element designed in keeping with the invention as a module support, FIG. 4 shows a paneling element with airbag fastened thereto, for covering a vehicle pillar, FIG. 5 shows a paneling element equipped with an airbag, for fastening in the region of the roof frame, FIG. 6 shows a paneling element designed according to the invention, with an airbag in the region of a door railing, FIG. 7 shows an airbag arrangement on the basis of the principle represented in FIG. 6, and FIG. 8 shows a view according to section VIII—VIII in FIG. 7.

DETAILED DESCRIPTION OF THE PREFERRED EMBODIMENTS

The same components have the same designations in all the figures.

In FIG. 1 there can be seen as a paneling element a housing 1, which has an internal cavity 2, designed as an airbag receiving chamber or its outer edges the housing 3 has clip lugs 3 and 4, which as detent means are arrested on a flange 5 and in a recess 6, respectively, of a vehicle body 7, represented here only in part. In kinematic reversal of the principle described above, there may similarly be stud bolts (not shown here) provided on the vehicle body, onto which bolts the housing 1 is clipped. Here, the housing 1 is of a two-part design and comprises a trim portion 1a, facing the vehicle occupant compartment, and a retaining portion 1b, fixing an airbag 8. Also of significance is a line duct 9, which is integrated into the housing 1 and is connected via a branch 10 to the airbag 8 (see also FIG. 2). Brought up to the airbag 8 is a line connection 11, which is connected to the branch 10. For fixing the airbag 8 to the retaining part 1b there is provided a clamping body 12, which is fastened by means of profiled slots 13, 14 to counterprofiles (not shown here) on the retaining part 1b. A thin dashed line indicates a film 15 which surrounds the airbag 8 and maintains the folded-together state of the airbag 8 in the cavity 2. The film is in this case dimensioned such that it is so weak as to offer no perceptible resistance to the expansion caused by inflation when the airbag 8 is filled via the branch 10 and the connection 11.

Also of essential significance for the function of the entire airbag device is a predetermined breaking point 16 (see FIG. 1), which tears open upon expansion of the airbag 8 and thus permits unfolding in a downwardly directed movement.

The configuration shown in cross section in FIG. 1 may be chosen such that a plurality of small airbags are arranged next to one another within the housing 1, which are then subjected to fluid pressure separately via branches respectively assigned to them or jointly. Also conceivable is a one-part airbag in the form of a tube which extends over a relatively long portion. In a way not shown here in any more detail, on end faces of the housing 1 there are provided connection pieces, by which the line duct 9 can be connected to a fluid propellant supply. The gas generator or generators are thus arranged outside the housing 1.

FIG. 3 shows a modified principle. Here, the paneling element 1' is formed in the manner of a module support, which on its outer sides 17 to 19 has a decorative function and on at least one of the opposite rear sides assumes arresting functions for elements of the airbag device. Thus, for a first assembly concept, there is provided a gas generator 20, which can be fastened on a connector base 21. The gas generator 20, arranged in this way on the wall element 1', is covered by an airbag 22, which is arrested by means of a clamping foot 23 on profiled bodies 24 to 27 (possible embodiments of which may be: fastening pins, profiled rails, molded-in sheet-metal parts with stud bolts fitted on, or the like).

In the case of a second concept, first of all a gas generator 28 and an airbag 29 are combined to form a structural unit, which is then fastened on a connector base 30, represented by dashed lines. The connector bases 21 and 30 are connected to an electrical line system 31, which is connected to an electrical connector 32. Via this connector 32, the wall element 1 can be connected to the vehicle electronics, in order to be able in this way to feed the signals supplied by a crash sensor to the ignition mechanisms in the gas generators 20 and 28.

As a departure from the embodiment represented in FIG. 3, electrical cables or line systems may, however, also be arrested on clip lugs, which are molded directly onto at least one of the rear sides of the wall element 1'. It is only for the sake of completeness that mention is made at this point that a line comparable with the function of the line duct 9 may also be arrested on the rear sides by means of clip connections.

The complete module represented in FIG. 3 is fastened on the vehicle body by arresting means 3' and 4', likewise only schematically indicated here.

FIGS. 4 to 8 show practical applications for the concepts described above. Thus, for example, there is shown in FIG. 4, as a typical installation situation in the region of a vertical pillar, a B pillar 33, which is formed here by two sheet-metal shells 33a and 33b. These shells 33a, 33b form retaining flanges 34 and 35, onto which the wall element 1" is clipped. The latter has been produced here in a plastics injection mold and has, in particular in the region of side walls 36 and 37, an elasticity which makes it possible for molded-on clamping grooves 38 and 39 to be slipped onto the retaining flanges 34 and 35. The connection between the retaining flange 35 and the clamping groove 39 is produced here, by a schematically indicated fastening means 40 (for example a screw), such that it is stable enough for the bond between the B pillar 33 and the housing 1" to be preserved in this region when the airbag 8" is filled through the line duct 9". Consequently, the assembly comprising the side wall 36 and the retaining flange 35 acts as a pivot bearing. The filling of the airbag 8 ensures that the side wall 37 is shifted outward and thus the clamping groove 38 is removed from the retaining flange 34. In this way, the airbag 8" can emerge in a directed manner (as shown in dashed lines).

FIG. 5 shows a wall element 1''', which is arranged by means of a pivot bearing 41 in the region of a roof frame and, as a releasable arresting mechanism, a clamping lug 43 is provided to engage over a retaining flange 42 of the roof frame. After filling via the line duct 9''', the airbag 8''' is moved downward alongside a schematically indicated window pane 44 into the position indicated by dashed lines. The pivot bearing 41 is in this case designed such that the entire wall element 1''' yields correspondingly in the direction of the vehicle interior. According to a particularly advantageous configuration, the wall element 1''' is also designed as an energy absorption element, so that, in the event of secondary impact, for example the head of a relatively tall vehicle occupant can still be effectively cushioned with respect to pillar parts of the vehicle even when the airbag 8''' has already largely deflated again. To provide the energy absorption function, in an advantageous embodiment (not shown here), the wall element comprises plastic-encapsulated reinforcements, for example sheet-metal plates, which at the same time may also be designed for receiving individual elements of the airbag device in an arresting manner.

The same also applies to a wall element 1'''', which is assigned to a window channel support 25. Together with a door panel 46, a visually appealing surface is formed, without the presence of the airbag 8'''' being apparent to the vehicle occupant. As a departure from the exemplary embodiment represented in FIG. 6, for example a region reaching approximately from points A to B may be made such that it is very yielding and, if appropriate, is restricted in its maximum mobility by straps (not illustrated), while a region reaching from B to C is made such that it is stable enough for no significant change in position to occur even when the airbag 8'''' unfolds. In this way, a directed expulsion of the airbag 8'''' upward and parallel to the window pane 44 is achieved, so that good protective effects can be achieved even for vehicle occupants who are in an unfavorable restraining position. The locally very narrow expansion at the beginning of the inflation process ensures that a vehicle occupant who is, for example, leaning against the window pane 44 is initially moved in the direction of the vehicle interior and subsequently, after the airbag 8'''' has unfolded completely, can be cushioned effectively over the entire width of the window pane in the event of side impact by either a colliding vehicle or a pile-like object acting intrusively on the vehicle body. The supporting of the vehicle occupant on the relatively large-area wall elements 1' to 1'''' ensures that the forces exerted by the occupant on the airbag are likewise distributed over a large surface area. The risk of the vehicle occupant passing through the airbag is thus significantly reduced.

FIG. 7 shows the inside view of a front door 47 and a rear door 48. Arranged within a door cavity, not shown here any further of the front door 47, is a gas generator 49, which applies filling pressure to a plurality of airbags 8, arranged one behind the other via a supply line 50 and a line duct 9'''', assigned to the wall element 1''''. In particular, the airbag facing the B pillar 33 is designed such that potential areas of impact at this portion of the vehicle are also covered. The air bags are sewn in such a way as to produce a thorax protecting portion 51 and a head protecting portion 52 in the inflated state (see FIG. 8).

For the rear door 48 there has been formed a wall element 53 which has in a forward region a front airbag 54 and in a region neighboring the rear seat bench an airbag tube 55. On a door frame 56 there is provided a paneling portion 57, which acts as a wall element and to which a head protecting airbag 58 is assigned. The airbags 54, 55 and 58 can be jointly inflated by means of a gas generator 59, installed in the rear door 48, and a fluid line system 60.

The front airbag 54 is designed so that when it is inflated at least portions thereof extend in the forward direction beyond the B pillar 33, in order to be able to provide effective protection in the event of side impact in particular to occupants on front seats positioned very far back. By contrast, the tubular airbag 55 and the head protecting airbag 58 are assigned to the vehicle occupant sitting on a rear seat.

The situations presented for the rear door may similarly be transferred to fixed side walls of vehicles. Thus, instead of a door rail, for example a profiled element in the region of a window rail may be used for the application of a module support designed according to the invention.

Particular filling characteristics may be set by means of valve controllers in the line duct 9 or by specific cross-sectional dimensioning in the branches 10 or in the region of the connections 11 assigned to the airbags. For instance, in the case of the configuration represented in FIG. 7, the line 9'''' is designed in such a way that the airbag 8'''' neighboring the B pillar 33 is inflated first. Thus, starting from the rear, a protective wall is built up in the forward direction. In this way, effective head protection is established immediately, in fractions of a second.

The gas generators 49 and 59 may also be installed at regions of the doors other than those represented in the drawing.

Thus, assembly of the airbag device described above is made easier by the fact that virtually no modifications are necessary in the area of overall vehicle assembly. Instead of conventional paneling elements, the personnel employed there thus receive the complete airbag module, which however can be fitted to the vehicle in the way with which the assembly personnel have long been familiar. Each module support together with the built-in parts can be prepared ready to install at a location away from the overall vehicle assembly. Thus, series production of a vehicle which is already in progress does not have to be altered in terms of the assembly sequences for use to be made of the invention. In addition, the airbag device according to the invention may also be retrofitted in old vehicles, provided that they have already been equipped with some other airbag system (for example in the steering wheel or in the dashboard).

I claim:

1. An airbag device for occupants of a vehicle having a body, the airbag device comprising:

a panelling part having a wall element;

at least one airbag;

at least one gas generator operative to inflate the at least one airbag, the airbag having an uninflated folded-together state, the panelling part and the at least one airbag forming a preassembled module;

arresting means provided on the preassembled module for fastening the module to at least one of the vehicle body and other panelling parts;

stable articulation means for fastening the wall element to the vehicle body, the wall element being movable between a rest position and a predetermined opening state position in a direction away from a side window of the vehicle the wall element being configured to cover the folded together airbag in the rest position, the stable articulation means being configured so that the wall element maintains the predetermined opening state position when moved by inflation of the airbag so that unfolding of the airbag is directed by the wall element along at least one of the side window and a vertical pillar of the vehicle:

a supply line in fluid communication with the gas generator; and a propellant line connection connected to the airbag.

2. An airbag device according to claim 1, and further comprising a housing containing the wall element.

3. An airbag device according to claim 2, wherein the wall element has a predetermined point of weakness at which the housing can be destroyed to produce an inflation opening by a filling pressure introduced into the airbag by the gas generator.

4. An airbag device according to claim 2, wherein the at least one gas generator is at most slightly covered by the housing, and further comprising the supply line connected to the gas generator.

5. An airbag device according to claim 2, and further comprising retaining means for electrical lines, the retaining means being provided on a rear side of the housing.

6. An airbag device according to claim 2, and further comprising the propellant line connection mounted to the housing and in fluid connection with the supply line, the supply line being configured so that at least portions thereof are formed as integral component parts of the housing.

7. An airbag device according to claim 1, wherein the wall element has a predetermined point of weakness at which the wall element can be destroyed to produce an inflation opening by a filling pressure introduced into the airbag by the gas generator.

8. An airbag device according to claim 7, wherein the arresting means is mounted to the wall element and includes first means configured to remain in a closed position during filling of the airbag as a stable articulation, and second means configured to assume a release state in preparation for one of swiveling and pivoting movement of the wall element.

9. An airbag device according to claim 8, wherein the second means includes at least one clip element configured to engage behind one of a retaining flange and a retaining wall of the vehicle body through a detent opening.

10. An airbag device according to claim 1, wherein the wall element is configured to form an airbag receiving chamber with at least a portion of the vehicle body.

11. An airbag device according to claim 10, wherein the panelling part is configured to cover a profiled portion of the vehicle body, the wall element being a component part of the panelling part.

12. An airbag device according to claim 11, wherein the wall element is configured to be connectable to one of a vertical pillar, a side wall rail, a window channel support, a door rail, a diagonally running frame element and a roof frame of the vehicle.

13. An airbag device according to claim 2, wherein the housing is configured to have a cavity formed as an airbag receiving chamber.

14. An airbag device according to claim 13, wherein the panelling part is configured to cover a profiled portion of the vehicle body, the housing being a component part of the panelling part.

15. An airbag device according to claim 14, wherein the housing is configured to be connectable to one of a vertical pillar, a side wall rail, a window channel support, a door rail, a diagonally running frame element and a roof frame of the vehicle.

16. An airbag device according to claim 1, wherein the supply line is configured so that it has at least portions that are integral component parts of the wall element.

17. An airbag device according to claim 1, wherein the at least one gas generator is at most slightly covered by the wall element, and further comprising the supply line connected to the gas generator.

18. An airbag device according to claim 1, wherein the propellant line connection is provided in a region of the wall element where there is an increased risk of head impact for at least one of the vehicle occupants in a mounted state of the wall element to the vehicle.

19. An airbag device according to claim 1, wherein the propellant line connection is arranged and configured so that when the airbag device is installed in the vehicle the propellant line connection is in a region at which a vertically running pillar of the vehicle abuts a roof frame of the vehicle.

20. An airbag device according to claim 1, wherein the propellant line connection is arranged and configured so that when the airbag device is installed in the vehicle the propellant line connection is in a region at which an approximately horizontal running profiled element abuts a vertical pillar of the vehicle.

21. An airbag device according to claim 1, wherein the panelling part is configured as a module support for a module formed of the gas generator and the airbag.

22. An airbag device according to claim 1, and further comprising retaining means for electrical lines, the retaining means being provided on a rear side of the wall element.

23. An airbag device according to claim 22, and further comprising elements of an electrical line system, the electrical line system elements being formed as an integral part of the wall element.

24. An airbag device according to claim 1, wherein the stable articulation means is formed as at least one pivot bearing.

25. An airbag device according to claim 1, wherein the stable articulation means is formed as a yielding region in the wall element.

26. An airbag device according to claim 1, wherein at least one region of the wall element is configured so that it is stable and does not undergo any significant change in position when the airbag unfolds, so as to define the predetermined opening state position.

27. An airbag device for occupants of a vehicle having a body, the airbag device comprising:

a panelling part having a wall element;

at least one airbag;

at least one gas generator operative to inflate the at least one airbag, the gas generator being arranged beneath the wall element of the panelling part, the airbag having an uninflated folded-together state in which the airbag is fastened to the wall element by attachment to the gas generator, the panelling part and the at least one airbag forming a preassembled module;

arresting means provided on the preassembled module for fastening the module to at least one of the vehicle body and other panelling parts; and means molded into the wall element for holding at least one of the airbag and the gas generator.

28. An airbag device for occupants of a vehicle having a body, the airbag device comprising:

a panelling part having a wall element;

at least one airbag;

at least one gas generator operative to inflate the at least one airbag, the gas generator being arranged beneath the wall element of the panelling part, the airbag having an uninflated folded-together state in which the airbag is fastened to the wall element by attachment to the gas generator, the panelling part and the at least one airbag forming a preassembled module;

arresting means provided on the preassembled module for fastening the module to at least one of the vehicle body and other panelling parts;

a housing containing the wall element; and means molded into the housing for holding at least one of the airbag and the gas generator.

* * * * *